US012588133B2

(12) United States Patent
Crowe

(10) Patent No.: US 12,588,133 B2
(45) Date of Patent: Mar. 24, 2026

(54) CUTTING OR WELDING TORCH COMPONENT COMPRISING A BUTTRESS THREAD

(71) Applicant: Thermacut, k.s., Uherske Hradiste (CZ)

(72) Inventor: George A. Crowe, Claremont, NH (US)

(73) Assignee: Thermacut, k.s., Uherské Hradit (CZ)

( * ) Notice: Subject to any disclaimer, the term of this patent is extended or adjusted under 35 U.S.C. 154(b) by 0 days.

(21) Appl. No.: 17/770,346

(22) PCT Filed: Oct. 17, 2020

(86) PCT No.: PCT/CZ2020/050082
§ 371 (c)(1),
(2) Date: Apr. 20, 2022

(87) PCT Pub. No.: WO2021/078313
PCT Pub. Date: Apr. 29, 2021

(65) Prior Publication Data
US 2022/0408540 A1 Dec. 22, 2022

(30) Foreign Application Priority Data

Oct. 21, 2019 (CZ) ................................ CZ2019-652

(51) Int. Cl.
| | |
|---|---|
| *H05H 1/26* | (2006.01) |
| *B23K 9/28* | (2006.01) |
| *H05H 1/34* | (2006.01) |

(52) U.S. Cl.
CPC ........... *H05H 1/3423* (2021.05); *B23K 9/287* (2013.01); *H05H 1/34* (2013.01); *H05H 1/3478* (2021.05)

(58) Field of Classification Search
CPC ...... H05H 1/3423; H05H 1/34; H05H 1/3478; H05H 1/26; B23K 9/287; B23K 10/00; B23K 7/10
(Continued)

(56) References Cited

U.S. PATENT DOCUMENTS

| | | | | | |
|---|---|---|---|---|---|
| 3,355,192 | A | * | 11/1967 | Kloesel, Jr. ........... | E21B 17/042 |
| | | | | | 285/94 |
| 3,917,319 | A | * | 11/1975 | Kloesel, Jr. ......... | E21B 17/0426 |
| | | | | | 175/85 |

(Continued)

FOREIGN PATENT DOCUMENTS

| | | |
|---|---|---|
| EP | 1 633 172 | 3/2006 |
| EP | 2 292 366 | 3/2011 |
| WO | 2019/020211 | 1/2019 |

OTHER PUBLICATIONS

"Pitch" definition, https://www.merriam-webster.com/dictionary/pitch, p. 5. (Year: 2006).*

(Continued)

*Primary Examiner* — Tiffany T Tran
(74) *Attorney, Agent, or Firm* — Warner Norcross + Judd LLP

(57) ABSTRACT

Cutting or welding torch component comprising a ridge (8) forming a thread for connecting the component to other parts of the cutting or welding torch, the thread having a pressure flank (81, 91), a clearance flank (82, 92), a root flat (84, 94) and a crest flat (83, 93), wherein—the angle included by the pressure flank (81, 91) and clearance flank (82, 92) is 60° or less, —the angle α included by the pressure flank (81, 91) and a plane perpendicular to the longitudinal axis (10, 20, 30) of the thread is 40° to 50°, —the angle β included by the clearance flank (82, 92) and a plane perpendicular to the
(Continued)

longitudinal axis (10, 20, 30) of the thread is 0° to 20°, and—the height (VZ) of the ridge (8) is 0.4 times the pitch of the thread or less.

9 Claims, 4 Drawing Sheets

(58) Field of Classification Search
USPC .................................... 285/94, 334; 411/414
See application file for complete search history.

(56) References Cited

U.S. PATENT DOCUMENTS

| | | | |
|---|---|---|---|
| 4,445,265 A | | 5/1984 | Olson et al. |
| 5,866,870 A | * | 2/1999 | Walduck ................ B23K 28/02 |
| | | | 219/121.45 |
| 6,155,613 A | * | 12/2000 | Quadflieg ............. F16L 15/001 |
| | | | 285/334 |
| 9,040,868 B2 | | 5/2015 | Leiteritz et al. |
| 9,950,386 B2 | * | 4/2018 | Cooper .................... B23K 9/26 |
| 2007/0132238 A1 | * | 6/2007 | Maeda ...................... B24C 1/10 |
| | | | 285/334 |
| 2008/0251571 A1 | * | 10/2008 | Burford ............. B23K 20/1255 |
| | | | 228/114.5 |
| 2013/0043222 A1 | * | 2/2013 | Leiteritz ................ B23K 10/00 |
| | | | 219/121.48 |
| 2015/0273616 A1 | * | 10/2015 | Cooper .................. B23K 9/295 |
| | | | 219/137.42 |
| 2015/0306675 A1 | * | 10/2015 | Dedrickson ......... B23B 31/1253 |
| | | | 279/62 |
| 2016/0360603 A1 | * | 12/2016 | Yang ......................... H05H 1/34 |
| 2017/0059063 A1 | * | 3/2017 | Perron ................. E21B 17/043 |
| 2021/0107085 A1 | * | 4/2021 | Cooper .................. B23K 9/295 |

OTHER PUBLICATIONS

International Search Report and the Written Opinion of the International Searching Authority for International Application No. PCT/CZ2020/050082 mailed Nov. 2, 2021, pp. 1-9.
Search Report of the Industrial Property Office of the Czech Republic for Application No. PV 2019-652 mailed Apr. 15, 2020, pp. 1-3.
Brochure from Wire Wizard entitled "High Performance Torch Consumables" at www.wire-wizard.com, pp. 1-4.

* cited by examiner

CUTTING OR WELDING TORCH COMPONENT COMPRISING A BUTTRESS THREAD

FIELD OF THE ART

The present invention relates generally to cutting and welding torch components provided with internal and/or external threads for mutual connection of the torch components.

BACKGROUND ART

A cutting and/or welding torch consists of a plurality of components which have to be mutually connected before use of the torch. Connection means include threads of various kind.

U.S. Pat. No. 9,040,868 B2 discloses a thread connection for torch components, the thread having a profile the flanks of which include an angle greater than 60°, while both flanks include the same angle with the axis of the thread.

EP1633172 discloses a thread connection for torch components, the thread having a profile the flanks of which include an angle 29° and each of the flanks includes an angle 14.5° with the axis of the thread.

There is a need for an innovation of the above threads in order to provide a threaded connection, which is stronger and provides better self-centering than the prior art threads, and which can be secured quickly and provides a significant heat transfer from one component to another while providing a secure and easily released connection between components. At the same time the thread should not add significantly to the overall size or mass of the components.

SUMMARY OF THE INVENTION

These and other objects and advantages are provided by the present invention, a component for a cutting or welding torch, the component comprising a helically extending ridge forming a thread for connecting the component to other parts of the cutting or welding torch, the thread having a pressure flank, a clearance flank, a root flat and a crest flat, wherein the angle included by the pressure flank and clearance flank is 60° or less, the angle $\alpha$ included by the pressure flank and a virtual plane perpendicular to the longitudinal axis of the thread is 40° to 50°, the angle $\beta$ included by the clearance flank and a virtual plane perpendicular to the longitudinal axis of the thread is 0° to 20°.

The height of the ridge is 0.4 times the pitch of the thread or less.

Preferably, the width of the root flat is at least 25% of the pitch, preferably 30 to 35% of the pitch, and the width of the crest flat is at least 25% of the pitch, preferably 30 to 35% of the pitch.

According to an advantageous embodiment, the angle $\alpha$ included by the pressure flank and the plane perpendicular to the longitudinal axis of the thread is 42° to 48°, and/or the angle $\beta$ included by the clearance flank and the plane perpendicular to the longitudinal axis of the thread is 10° to 20°, preferably 10° to 15°.

Preferably, the component is one of a torch body, a retaining cap, an electrode and a shield.

Preferably, when the thread is a female/internal thread, the pressure flank faces the distal direction and the relief flank faces the proximal direction of the component of the torch, and when the thread is a male/external thread, the clearance flank faces the distal direction and the pressure flank faces the proximal direction.

There may be a pair of the above defined components for a cutting or welding torch, wherein the thread of one of the pair is an internal thread and the thread of the other of the pair is an external thread, wherein the components are mutually releasably connectable by the threads.

The above objects and advantages are provided also by a cutting or welding torch comprising a torch body, a retaining cap, a shield and an electrode, wherein at least one of them is the above defined component. Preferably, the retaining cap is provided with a thread for releasable attachment to a distal end of the torch body and with a thread for a releasable attachment to the shield, wherein at least one of the threads of the retaining cap has a pressure flank, a clearance flank, a root flat and a crest flat, wherein the included angle of the pressure flank and clearance flank is 60° or less, the angle $\alpha$ included by the pressure flank and a plane perpendicular to the longitudinal axis of the thread is 40° to 50°, the angle $\beta$ included by the clearance flank and the plane perpendicular to the longitudinal axis of the thread is 0° to 20°.

The height of the ridge is 0.4 times the pitch of the thread or less.

BRIEF DESCRIPTION OF DRAWINGS

Preferred embodiments of the present invention will now be described more fully with reference to the accompanying drawings, which are not necessarily to the scale and which show FIG. 1 a longitudinal cross-sectional view of a torch shield comprising an internal thread according to the invention, FIG. 2 a longitudinal cross-sectional view of a retaining cap comprising an external thread at the distal end and an internal thread at the proximal end according to the invention, FIG. 3 a longitudinal cross-sectional view of a torch body comprising an external thread at the distal end thereof according to the invention, FIG. 4 a longitudinal cross-sectional view of an assembly of the shield, retaining cap and torch body of FIGS. 1 to 3.

DESCRIPTION OF PREFERRED EMBODIMENTS

Figure 1:
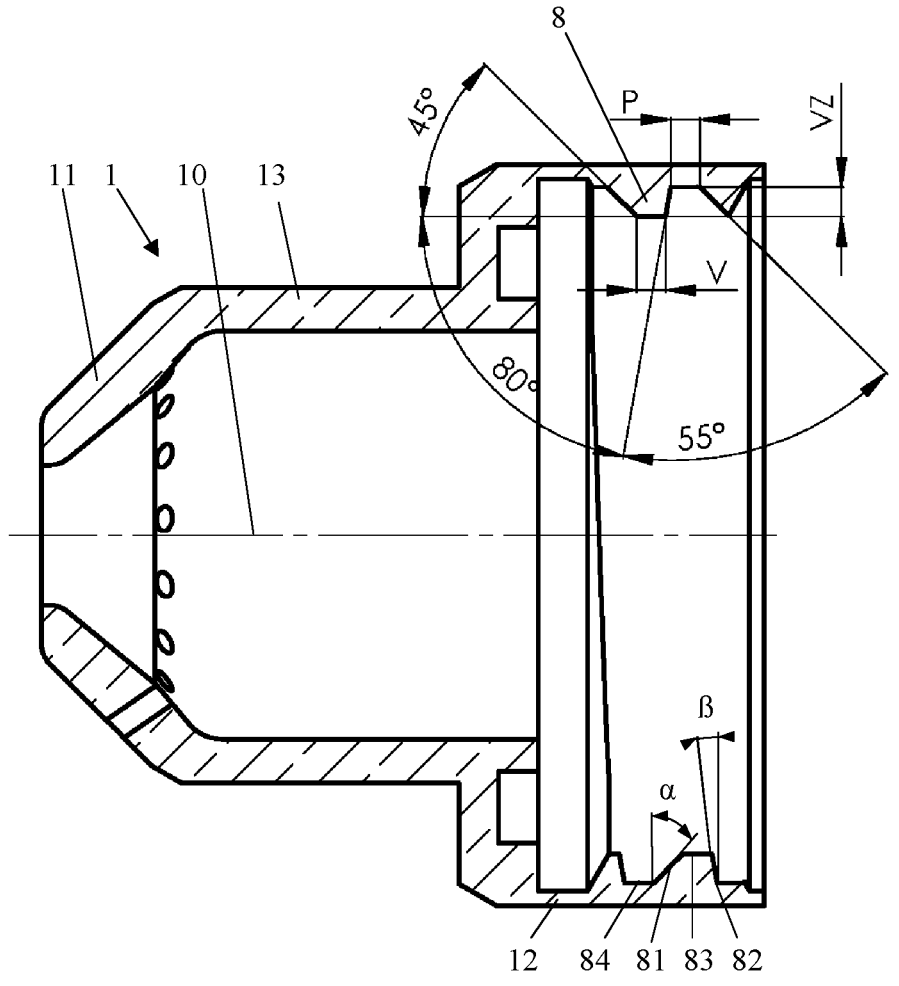

The shield 1 shown in FIG. 1 comprises a hollow cylindrical body 13, a conical distal end 11 and a proximal end 12, which includes an internal thread. The internal thread of the shield 1 has a longitudinal axis 10.

The internal thread is a single start thread formed by a helical truncated ridge 8. The ridge 8 has a pressure flank 81 and a clearance flank 82, which are mutually connected by a crest flat 83. A root flat 84 is formed between the turns of the helical ridge 8.

In this particular embodiment, the pressure flank 81 and the radius of the thread, or the plane perpendicular to the longitudinal axis 10 of the thread, include an angle $\alpha$ of 45°, the clearance flank 82 and the radius of the thread include an angle $\beta$ of 10°, so that the angle included by the pressure flank 81 and the relief flank 82 is 55°.

The root flat 84 is 1 mm (measured in the direction parallel to the axis 10), the crest flat 83 is 1 mm and the height VZ of the ridge 8 is 1 mm (measured in radial direction). The pitch in this example is 3.18 mm, (more precisely 3.175 mmm=8 threads per inch).

Figure 2:
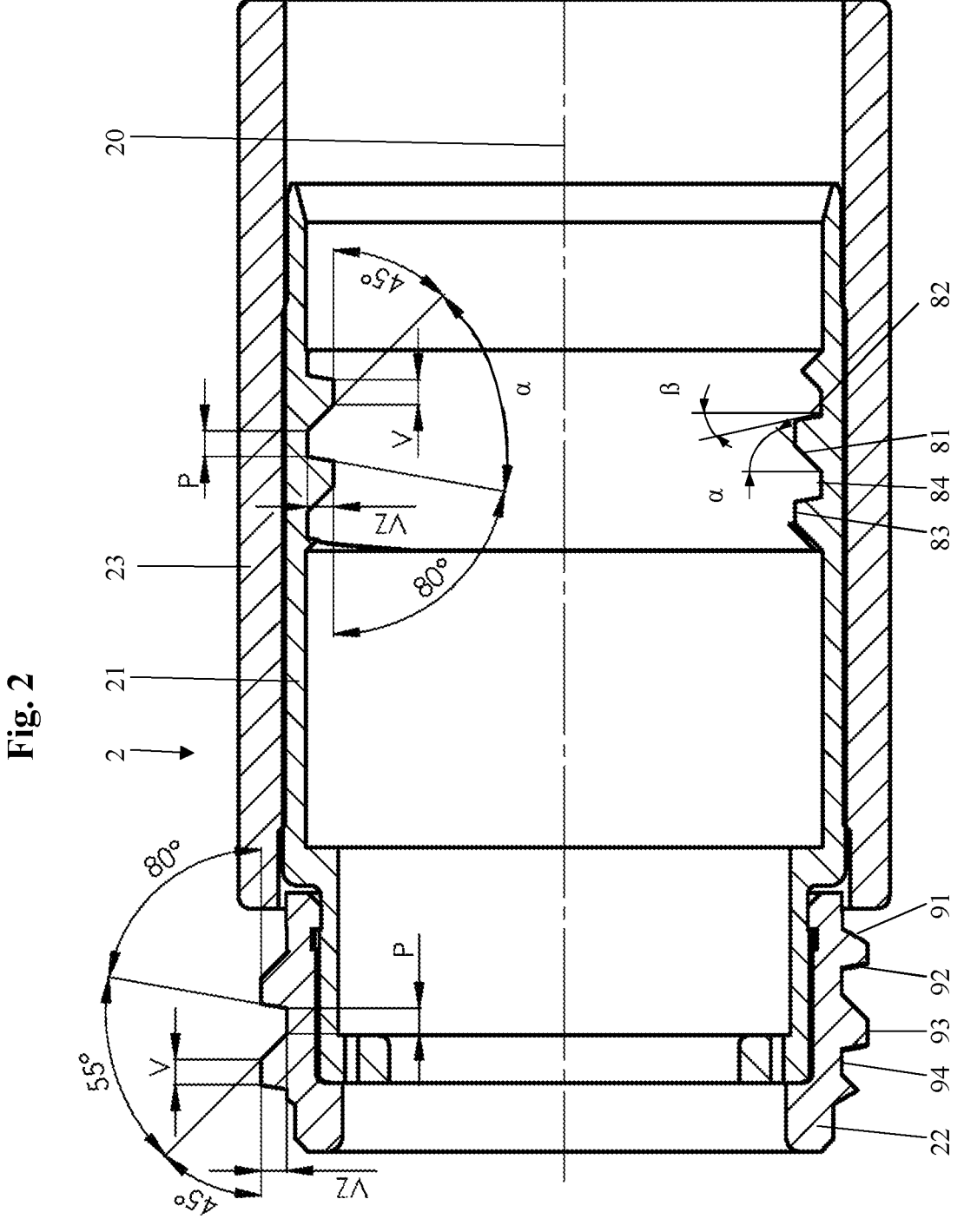

FIG. 2 shows a retaining cap 2, which consists of a hollow cylindrical inner liner 21, a connector ring 22 press fitted onto the distal end of the inner liner 21 and of a cover 23 press fitted onto the proximal part of the liner 21.

The connector ring 22 is provided with an external thread, which is designed to engage with the inner thread of the shield 1. Therefore, the pressure flank 91 of the external thread and the plane perpendicular to the longitudinal axis 20 of the external thread, include an angle $\alpha$=45°, the clearance flank 92 and the plane perpendicular to the longitudinal axis 20 of the external thread include an angle $\beta$=10°, so that the included angle of the pressure flank 91 and the clearance flank 92 is 55°.

The liner 21 is provided with an internal thread arranged close to the proximal end of the liner 21. Preferably, the internal thread of the liner 21 has the same characteristics as the internal thread of the shield 1, i.e. the flank angles and relative size of the crest flats 83 and root flats 84 with respect to the pitch of the thread.

Figure 3:
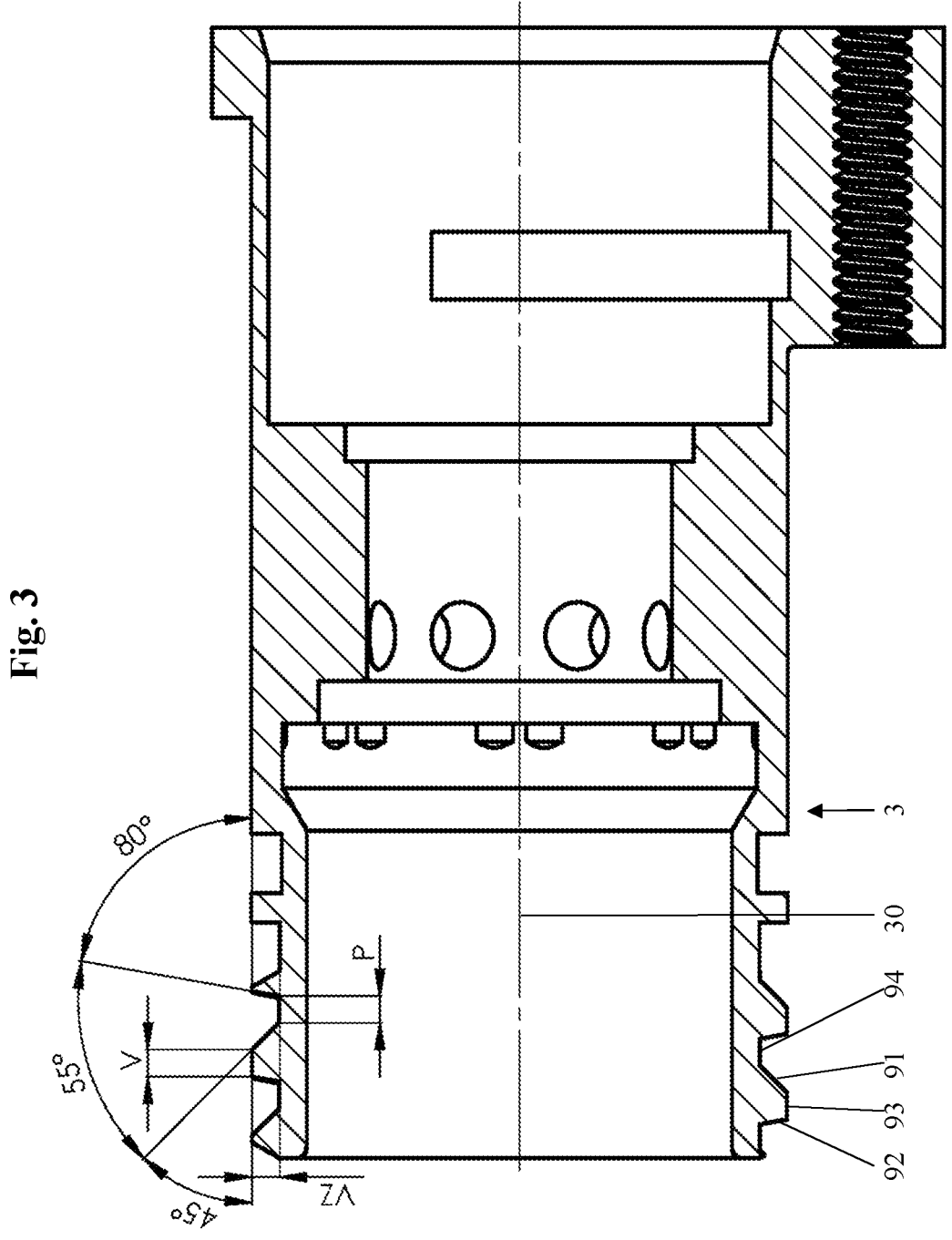

The torch body 3 shown in FIG. 3 is provided with an external thread designed to engage with the internal thread of the liner 21.

Therefore, in this particular embodiment, the pressure flank 91 of the external thread and the plane perpendicular to the longitudinal axis 20 of the external thread, include an angle $\alpha$=45°, the clearance flank 92 and the plane perpendicular to the longitudinal axis 20 of the external thread include an angle $\beta$=10°, so that the included angle of the pressure flank 91 and the clearance flank 92 is 55°

Figure 4:
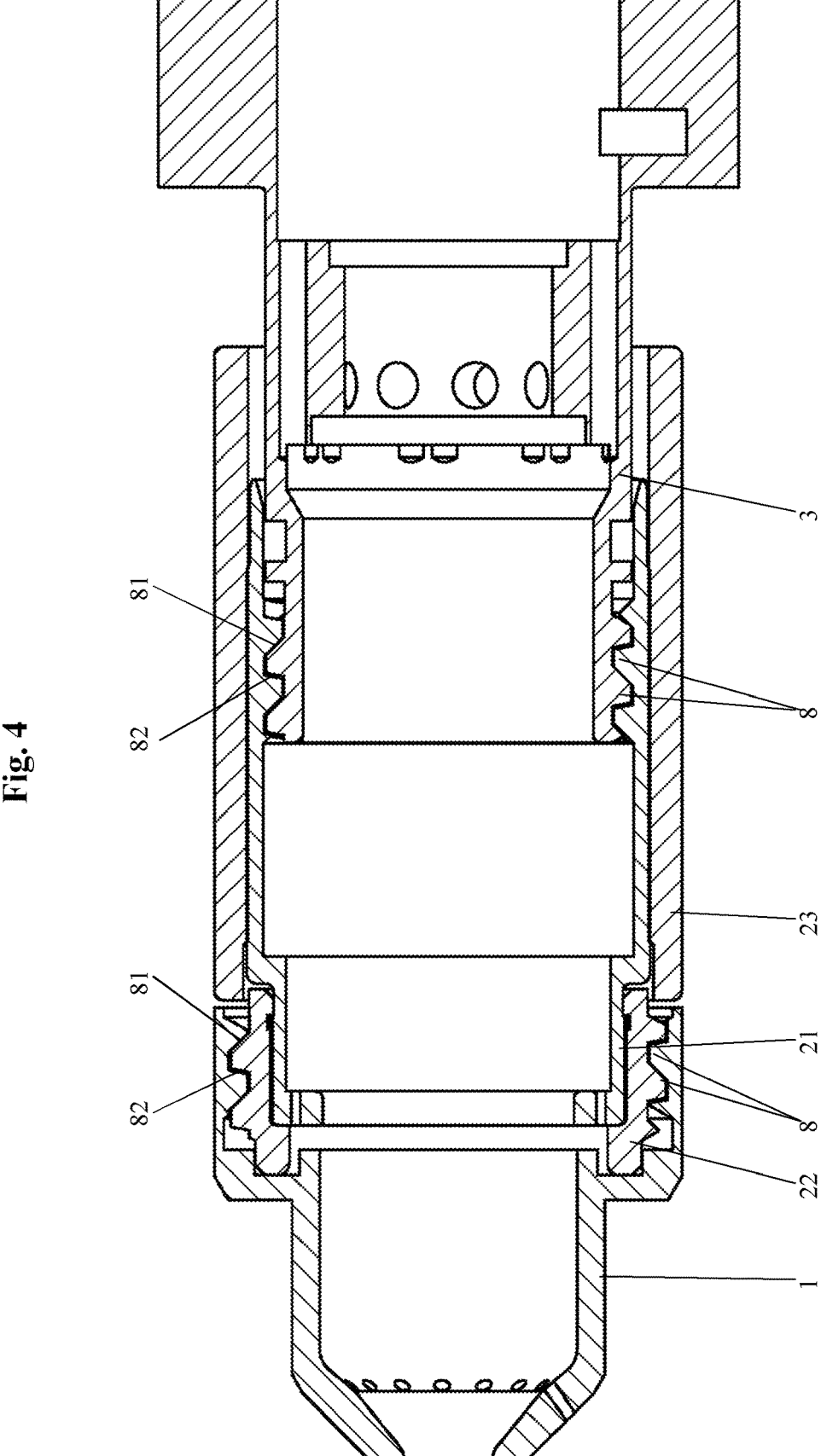

FIG. 4 shows an assembly, wherein the retaining cap 2, or rather the inner liner 21, is coupled to the torch body 3 by means of the threaded connection between the external thread of the torch body 3 and the internal thread of the inner liner 21. The shield 1 is coupled to the retaining cap 2, more precisely to the connector ring 22, by means of the threaded connection between internal thread of the shield 1 and the external thread of the connector ring 22.

The above embodiment, as well as further exemplary embodiments of the invention are listed in the table below.

|  | Example 1 | Ex. 2 | Ex. 3 | Ex. 4 | Ex. 5 | Ex. 6 | Ex. 7 |
|---|---|---|---|---|---|---|---|
| Pressure flank angle $\alpha$ | 45° | 45° | 45° | 40° | 50 | 50 | 50 |
| Clearance flank angle $\beta$ | 10° | 0° | 15° | 20° | 0 | 5 | 10 |
| Height VZ of the ridge (mm) | 1 | 1 | 1.2 | 1.1 | 1.2 | 0.9 | 0.9 |
| Pitch (mm) | 3.18 | 3.10 | 3.39 | 3.18 | 3.39 | 3.0 | 3.1 |

In summary, the pressure flank angle $\alpha$ is preferably 40 to 50°, the clearance flank angle $\beta$ is 0° to 20, preferably 10 to 20°, the included angle of the pressure flank and the clearance flank is 60° or less than 60°.

As used herein, the flank angles $\alpha$, $\beta$ are measured, when viewed in a longitudinal cross-section comprising the longitudinal axis 10, 20, 30.

The width P of the root flat 84, 94 and the width V of the crest flat 83, 93 each amount for at least 25% of the pitch, preferably 25 to 38%, most preferably 30 to 35% of the pitch.

For example, the threads of the shield 1 and the retaining cap 22 may be compared with a Unified 60° thread 0.9375"– 0.125" thread, i.e. a thread having a major diameter=23.81 mm and pitch=3.175 mm and angle included by flanks=60°. Such external Unified thread would have a minimum height of at least 0.06315" and a theoretical height of 0.08118", while the thread described with respect to FIG. 2 would have the maximum height of the external thread equal to 0.0401" and the maximum height of the internal thread equal to 0.0404".

The above specified increased pressure flank angle $\alpha$ in the inventive threads provides a greatly increased compressive force. Because of the higher than normal helix angle of the inventive thread the increased compressive force provided by the more shallow pressure flank angle $\alpha$ is necessary. The combination of a relatively high helix angle with increased compression results in a thread that is both easily secured and easily released. The 40 to 50° pressure flank angle $\alpha$ also results in more surface area than a lower angle, e.g. 30° flank angle would. The increased surface aids in electrical and/or thermal transfer. The invention allows for a single start, single turn, course thread to be used in the same space as with prior art torch components having a finer, multiple revolutions thread. As a result, the internal and external threads according to the invention are rugged and can be applied by as little as a single rotation.

The thread connections according to the invention are particularly suitable for connecting components of cutting and welding torches, especially for plasma arc torches. Components, which may be provided with the inventive threads, are e.g. shield, retaining cap, torch body, nozzle, swirl ring, electrode, etc.

Material of such components is preferably metal, such as brass, copper, the threaded portion at the distal end of the retaining cap may be plastic (Vespel polyimide, Meldin polyimide, or PEEK—polyether ether ketone).

As with any thread, the surface of the pressure flank contacts the mating thread when the parts are in tension. A pressure flank angle $\alpha$ of 40 to 50° improves alignment by the thread compared with a conventional 60° (30°/30°) thread. Having the pressure flank angle $\alpha$ at 40 to 50° also increases the compressive force on the thread allowing for increased gripping force, (normal force applied to the flank of the proposed thread is 41.4% greater than the tension of the thread, while in a symmetrical 60° thread it is only 15.5% greater and the thread of EP1633172 provides only 3.3% greater gripping force. The increased gripping force of the inventive thread allows for an increased helix angle, which requires less rotations of the mating part for assembly.

The combination of truncated thread, i.e. thread provided with root flats 84 and crest flats 83, and of the asymmetrical flanks 81, 82, one of which forms the pressure flank angle $\alpha$=40 to 50°, results in a thread, which is self-centering and short and single start and which provides a consistent seating of the components.

The thread described in EP1633172 has an included angle of only 29°, with a flank angle of only 14.5°, making it unreliable for self-centering and susceptible to damage, especially to damage of the crest areas of the thread.

Therefore, the effect of the invention is a thread form by means of which, parts can be secured and released without the use of any tools by as little as a single revolution, while providing adequate strength and thermal and electrical transfer and insuring that the thread diameters remain as compact as a standard 60 degree screw thread with half the pitch.

Various modifications of the above presented embodiments may be considered by persons skilled in the art. Therefore, it is to be understood that the invention is not to be limited to the specific embodiments disclosed and that modifications and other embodiments are intended to be protected as far as they fall within the scope of the appended claims.

The invention claimed is:

1. A cutting or welding torch component, the cutting or welding torch component comprising:
   a ridge forming a thread for connecting the cutting or welding torch component to other parts of a cutting or welding torch, the thread having a pressure flank, a clearance flank, a root flat, and a crest flat, wherein:
   the thread is a single start thread,
   an angle included by the pressure flank and the clearance flank is 60° or less,
   an angle $\alpha$ included by the pressure flank and a plane perpendicular to a longitudinal axis of the thread is 40° to 50°,
   an angle $\beta$ included by the clearance flank and a plane perpendicular to the longitudinal axis of the thread is 0° to 20°, and
   a height of the ridge is 0.4 times a pitch of the thread or less.

2. The component according to claim 1, wherein a width of the root flat is at least 25% of the pitch.

3. The component according to claim 2, wherein a width of the crest flat is at least 25% of the pitch.

4. The component according to claim 1, wherein the angle $\alpha$ is 42° to 48°, and/or the angle $\beta$ is 10° to 20°.

5. The component according to claim 1, wherein the component is one of a torch body, a retaining cap, an electrode, and a shield.

6. A pair of components for a cutting or welding torch, each according to claim 1, wherein the thread of one of the pair is an internal thread and the thread of the other of the pair is an external thread, wherein the components are mutually releasably connectable by the threads.

7. A cutting or welding torch comprising a torch body, a retaining cap, a shield, and an electrode, at least one of which is the component of claim 1.

8. The cutting or welding torch of claim 7, wherein the retaining cap is provided with a first thread for a releasable attachment to a distal end of the torch body and with a second thread for a releasable attachment to the shield, wherein at least one of the first and second threads of the retaining cap is the thread for connecting.

9. The component according to claim 4, wherein the angle $\beta$ is 10° to 15°.

* * * * *